(12) United States Patent
Hatano et al.

(10) Patent No.: US 9,023,159 B2
(45) Date of Patent: May 5, 2015

(54) STEEL FOR HEAT TREATMENT

(75) Inventors: Hitoshi Hatano, Kobe (JP); Takuya Kochi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 181 days.

(21) Appl. No.: 12/996,581

(22) PCT Filed: Jun. 17, 2009

(86) PCT No.: PCT/JP2009/061044
§ 371 (c)(1),
(2), (4) Date: Dec. 6, 2010

(87) PCT Pub. No.: WO2009/154235
PCT Pub. Date: Dec. 23, 2009

(65) Prior Publication Data
US 2011/0091348 A1    Apr. 21, 2011

(30) Foreign Application Priority Data
Jun. 19, 2008  (JP) .................. 2008-160987

(51) Int. Cl.
*C22C 38/00* (2006.01)
*C22C 38/04* (2006.01)
(Continued)

(52) U.S. Cl.
CPC ........... *C22C 38/04* (2013.01); *C21D 6/005* (2013.01); *C21D 8/0226* (2013.01); *C21D 8/0263* (2013.01); *C22C 38/06* (2013.01);
(Continued)

(58) Field of Classification Search
CPC ........ C22C 38/04; C22C 38/00; C22C 38/06; C21D 6/005; C21D 8/0226

USPC ........... 420/83, 84, 91, 92, 104, 105; 148/567
See application file for complete search history.

(56) References Cited

U.S. PATENT DOCUMENTS

| 4,629,504 A * | 12/1986 | Koike et al. ............... 420/38 |
| 6,660,105 B1 | 12/2003 | Ochi et al. |
| 2008/0247900 A1 * | 10/2008 | Hayashi et al. ............ 420/84 |

FOREIGN PATENT DOCUMENTS

| JP | 61 223168 | 10/1986 |
| JP | 11 80903 | 3/1999 |

(Continued)

OTHER PUBLICATIONS

NPL: ASTM E112-96 (2004).*

(Continued)

*Primary Examiner* — Jie Yang
(74) *Attorney, Agent, or Firm* — Oblon, McClelland, Maier & Neustadt, L.L.P.

(57) ABSTRACT

A steel for heat treatment, which exhibits high strength and high toughness even when the heat treatment (such as quenching and tempering) of the steel is conducted under conventional conditions in an after stage. The steel for heat treatment contains C: 0.10 to 0.70 mass %, Mn: 0.1 to 3.0 mass %, Al: 0.005 to 2.0 mass %, P: 0.050 mass % or less, S: 0.50 mass % or less, O: 0.0030 mass or less, N: 0.0200 mass % or less, and one or more selected from the group consisting of Ti: 0.30 mass % or less and Nb: 0.30 mass or less with the balance being Fe and unavoidable impurities, and has a TH value of 1.0 or above as calculated according to the formula: $(\{Ti\}/48+\{Nb\}/93) \cdot 10^4$ and grain diameters of 10 μm or below. $\{Ti\}$ and $\{Nb\}$ refer respectively to the contents of Ti and Nb in precipitates of 5 to 100 nm in size as determined about their respective extraction residues.

17 Claims, 2 Drawing Sheets

(51) Int. Cl.
*C21D 6/00* (2006.01)
*C21D 8/02* (2006.01)
*C22C 38/06* (2006.01)
*C22C 38/26* (2006.01)
*C22C 38/28* (2006.01)
*C22C 38/34* (2006.01)

(52) U.S. Cl.
CPC ................ *C22C 38/26* (2013.01); *C22C 38/28* (2013.01); *C22C 38/34* (2013.01)

(56) References Cited

FOREIGN PATENT DOCUMENTS

| | | |
|---|---|---|
| JP | 11 181542 | 7/1999 |
| JP | 2002 194496 | 7/2002 |
| JP | 2004 183065 | 7/2004 |
| JP | 2005 240175 | 9/2005 |
| JP | 2006 161142 | 6/2006 |
| JP | 2006 161144 | 6/2006 |
| JP | 2006 307270 | 11/2006 |
| WO | 99 05333 | 2/1999 |

OTHER PUBLICATIONS

Office Action issued Aug. 3, 2012 in Korean Application No. 10-2010-7028451 (With English Translation).

International Search Report issued Sep. 15, 2009 in PCT/JP09/61044 filed Jun. 17, 2009.

Office Action issued in Japanese Patent Application No. 2008-160987 issued Apr. 25, 2013 (with English Translation).

* cited by examiner

STEEL FOR HEAT TREATMENT

TECHNICAL FIELD

The present invention relates to a steel for heat treatment which is subjected to a heat treatment such as quenching and/or tempering and then used in the production of structural materials for automobiles and other transport equipment and for industrial machinery. Specifically, it relates to a steel for heat treatment which will have a high strength and a high toughness after undergoing the heat treatment.

BACKGROUND ART

Structural materials for use typically in automobiles and other transport equipment and in industrial machinery secure strength and toughness at certain levels by forming a steel for heat treatment supplied by a steel maker into a predetermined shape typically through press forming, and subjecting the formed steel to a heat treatment such as quenching and/or tempering. For providing a structural material having an especially high strength and high toughness, a technique has been proposed in which the steel is controlled to have a prior austenite (γ) grain size of 5 μm or less.

Typically, Patent Literature 1 (PTL 1) discloses a high-strength steel member which contains C: 0.25 to 0.35 percent by mass, Si: 0.5 percent by mass or less, Mn: 0.2 to 1.0 percent by mass, P: 0.01 percent by mass or less, S: 0.01 percent by mass or less, Al: 0.01 to 0.1 percent by mass, N: 0.002 to 0.01 percent by mass and Ni: 7 to 12 percent by mass, with the residue being Fe and inevitable impurities or which contains C: 0.25 to 0.35 percent by mass, Si: 0.5 percent by mass or less, Mn: 0.2 to 1.0 percent by mass, P: 0.01 percent by mass or less, S: 0.01 percent by mass or less, Al: 0.01 to 0.1 percent by mass, N: 0.002 to 0.01 percent by mass and Ni: 7 to 12 percent by mass and further contains one or more elements selected from the group consisting of Cr: 0.1 to 1.0 percent by mass, Mo: 0.01 to 1 percent by mass, Ti: 0.01 to 0.05 percent by mass, Nb: 0.01 to 0.05 percent by mass and B: 0.0003 to 0.005 percent by mass, with the residue being Fe and inevitable impurities. This high-strength steel member includes very fine grains of prior austenite with grain sizes of 5 μm or less, has a tensile strength of 1400 MPa or more and excels in resistance to delayed fracture.

PTL 1 discloses a process which includes the step of heating the steel to a temperature of 850° C. to 1000° C. thereby hot-working the steel, performing a finish working on the steel in a temperature range of 700° C. or lower and the martensite start point (Ms point) or higher at a reduction of area of 20 to 50 percent by mass and immediately cooling the steel; and the step of performing rapid heating of the steel as a subsequent heat treatment at a temperature equal to or higher than the Ac3 transformation point and equal to or lower than 900° C., and immediately cooling the heated steel.

Patent Literature 2 (PTL 2), for example, discloses a high-strength steel excellent in resistance to delayed fracture, which has a specific composition, has been quenched and tempered under specific conditions and has an austenite grain size in terms of ASTM No. 8.5 or more.

PTL 2 describes that the steel is heated to a temperature equal to or higher than the Ac3 transformation point, quenched and then tempered at a temperature equal to or higher than 580° C. and equal to or lower than the Ac1 transformation point under such conditions that $P_{LN}$ is 16.8× $10^3$ or more.

Independently for example, Patent Literature 3 (PTL 3) discloses a spring steel wire having a tempered martensite microstructure obtained from a specific composition mainly through quenching and tempering, in which the martensite grains include carbides having such shapes as to have an average aspect ratio of 3.0 or more.

PTL 3 describes that the heating in quenching and tempering is performed at a heating rate of 50° C. to 2000° C. per second for a holding time of 0.5 to 30 seconds.

CITATION LIST

Patent Literature

PTL 1: Japanese Unexamined Patent Application Publication (JP-A) No. 11-80903
PTL 2: Japanese Unexamined Patent Application Publication (JP-A) No. 61-223168
PTL 3: Japanese Unexamined Patent Application Publication (JP-A) No. 2002-194496

SUMMARY OF INVENTION

Technical Problem

However, the technique disclosed in PTL 1 should add large amounts of alloy elements to the steel for heat treatment, and this causes high cost and a complicated production process.

The technique disclosed in PTL 2 should perform workings such as wire drawing, cold rolling and cold forging, as well as quenching and tempering under specific conditions, and thus suffer from a complicated production process.

The techniques disclosed in PTL 3 should perform the heating at a high heating rate for a short holding time and thereby suffers from a complicated production process.

In addition, all the techniques disclosed in PTLs 1 to 3 should perform quenching and tempering under specific conditions after the completion of hot rolling. Specifically, quenching and tempering under such specific conditions should be performed in a customer's plant after the steel is supplied to the customer. Accordingly, it is difficult to produce a steel for heat treatment having a high strength and a high toughness according to these techniques.

The present invention has been made to solve the above-mentioned problems, and an object of the present invention is to provide a steel for heat treatment which is produced according to a simple production process without increasing amounts of alloy elements and which will have a prior austenite grain size of 5 μm or less and have a high strength and a high toughness even after undergoing a heat treatment, such as quenching and/or tempering, performed in a subsequent step under customary or regular conditions.

Solution to Problem

The present inventors have found that size-reduction of the microstructure before quenching allows reverse transformation nuclei of austenite (γ) to form in a larger amount and that precipitation of such fine and stable precipitates beforehand impedes the growth of grains after transformation to austenite (γ). The present invention has been made based on these findings.

(1) The present invention solves the above problems and provides, in an embodiment, a steel for heat treatment, which includes C: 0.10 to 0.70 percent by mass, Mn: 0.1 to 3.0 percent by mass, Al: 0.005 to 2.0 percent by mass, P: 0.050 percent by mass or less, S: 0.50 percent by mass or less, O: 0.0030 percent by mass or less, N: 0.0200 percent by mass or less and at least one element selected from the group consisting of Ti: 0.30 percent by mass or less and Nb: 0.30 percent by mass or less, with the residue being Fe and inevitable impurities, in which the steel has a TH value as determined according to following Formula 1 of 1.0 or more and has a grain size of 10 μm or less:

$$TH=(\{Ti\}/48+\{Nb\}/93)\times 10^4 \quad \text{(Formula 1)}$$

wherein, in Formula 1, {Ti} and {Nb} represent contents (percent by mass) of Ti and Nb, respectively, in precipitates having sizes of 5 to 100 nm as respectively determined on a residue of the steel after extraction.

The steel for heat treatment according to the present invention has a specific alloy composition, has a grain size at a specific level or less and satisfies a specific relationship as mentioned above. The steel therefore contains fine and stable precipitates prior to quenching and can thereby have a finer microstructure before quenching. This allows reverse transformation nuclei of austenite (γ) to form in a larger amount. In addition, the precipitation of fine and stable precipitates prior to quenching impedes the growth of γ grains after transformation thereto. Specifically, the γ grains can thereby remain fine and resists causing fracture.

Thus, the steel for heat treatment will have a high strength and a high toughness after a heat treatment performed in a subsequent process even under customary conditions. As used herein the term "high strength" refers to that a steel in question has a tensile strength of 1.2 GPa or more; and the term "high toughness" refers to that the steel in question has a ductile-brittle transition temperature (vTrs) of −80° C. or lower.

(2) The steel for heat treatment according to the present invention preferably contains at least one element selected from the group consisting of Ni: 3.0 percent by mass or less and Cu: 3.0 percent by mass or less. These elements allow the steel to have a further higher strength and a further higher toughness and to show higher corrosion resistance.

(3) The steel for heat treatment according to the present invention preferably contains at least one element selected from the group consisting of Ca: 0.0050 percent by mass or less, Mg: 0.0050 percent by mass or less and one or more rare earth metals (REM): 0.020 percent by mass or less. These elements combine with sulfur (S) to form sulfides, thus prevent the elongation (growth) of MnS inclusions and thereby further improve the toughness.

(4) The steel for heat treatment according to the present invention preferably contains at least one element selected from the group consisting of V: 1.0 percent by mass or less, Zr: 0.10 percent by mass or less, Ta: 0.10 percent by mass or less and Hf: 0.10 percent by mass or less. These elements combine with carbon (C) or nitrogen (N) to form carbides, nitrides and/or carbonitrides to reduce the size of γ grains, and this allows the ultimate microstructure to be more finer to thereby further improve the toughness.

(5) The steel for heat treatment according to the present invention preferably contains Si: 3.0 percent by mass or less. This element allows cementite, which will precipitate upon tempering, to be finer and thereby allows the steel to have further higher toughness.

(6) The steel for heat treatment according to the present invention preferably contains at least one element selected from the group consisting of Mo: 2.0 percent by mass or less and B: 0.0150 percent by mass or less. These elements allow the steel to have more satisfactory hardenability and to have a higher strength.

(7) The steel for heat treatment according to the present invention preferably has a hardness in term of Vickers hardness (Hv) of 450 or less. The steel for heat treatment having this configuration is not excessively hard and, even when subjected to a process such as wire drawing, cold rolling, or cold forging before a heat treatment such as quenching and/or tempering, does not cause the mold to have a shorter life.

Advantageous Effects if Invention

The steel for heat treatment according to the present invention has the specific alloy composition, has the specific grain size, satisfies the specific relationship, and thereby prevents the growth of γ grains after transformation. The steel for heat treatment, when subjected to a heat treatment performed in a subsequent process even under customary conditions, can therefore give a high-toughness and high-strength steel having a tensile strength of 1.2 GPa or more and a ductile-brittle transition temperature (vTrs) of −80° C. or lower.

DESCRIPTION OF EMBODIMENTS

Figure 1:
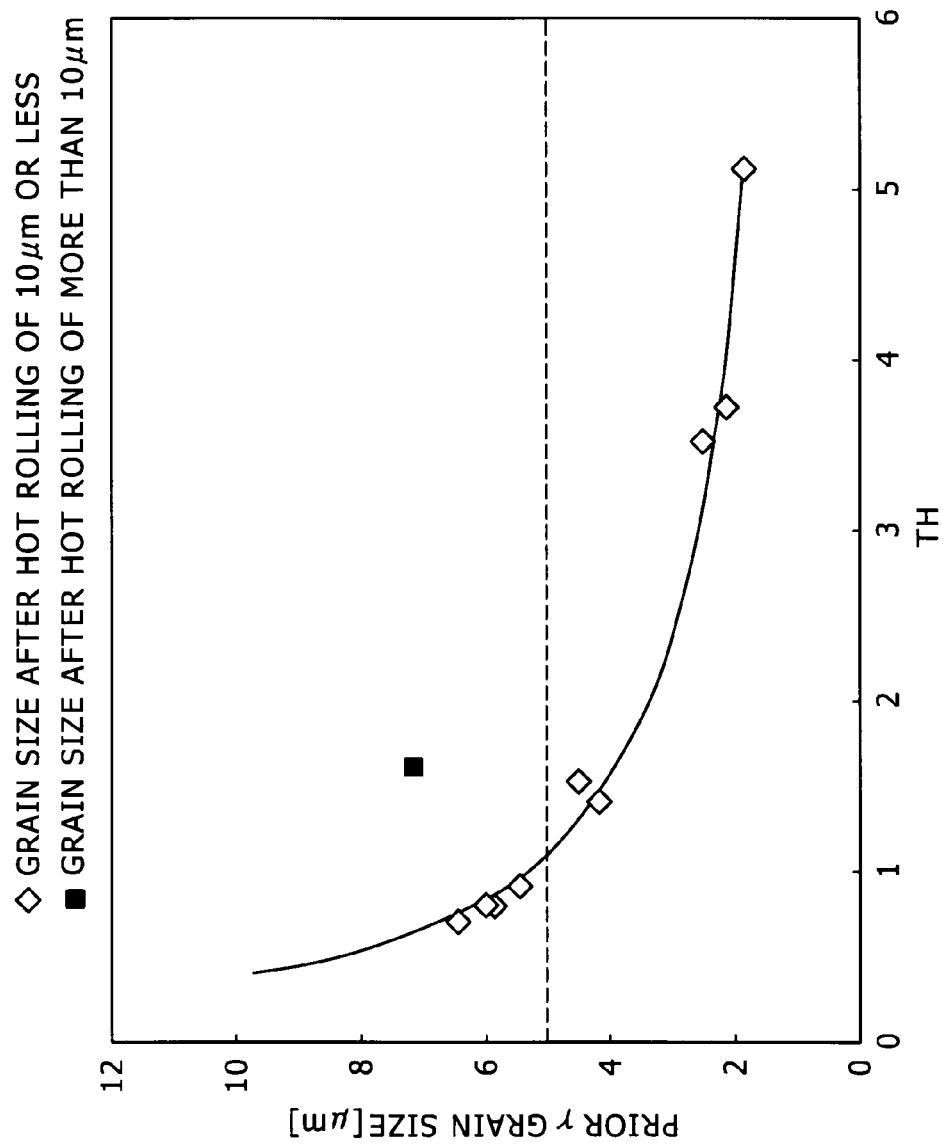
FIG. 1 is a graph showing how the prior γ grain size (μm) varies depending on the TH value as determined according to Formula 1 on a steel for heat treatment (◇) having a grain size of 10 μm or less, and on a steel for heat treatment (■) having a grain size of more than 10 μm.

A steel for heat treatment according to the present invention and a production method thereof will be illustrated in detail below.

The steel for heat treatment according to the present invention contains C: 0.10 to 0.70 percent by mass, Mn: 0.1 to 3.0 percent by mass, Al: 0.005 to 2.0 percent by mass, P: 0.050 percent by mass or less, S: 0.50 percent by mass or less, O: 0.0030 percent by mass or less, N: 0.0200 percent by mass or less and at least one element selected from the group consisting of Ti: 0.30 percent by mass or less and Nb: 0.30 percent by mass or less, with the residue being Fe and inevitable impurities, has a TH value as determined according to following Formula 1 of 1.0 or more and has a grain size of 10 μm or less.

$$TH=(\{Ti\}/48+\{Nb\}/93)\times 10^4 \quad \text{(Formula 1)}$$

In Formula 1, {Ti} and {Nb} represent contents (percent by mass) of Ti and Nb, respectively, in precipitates having sizes of 5 to 100 nm as respectively determined on a residue of the steel after extraction.

(C: 0.10 to 0.70 Percent by Mass)

Carbon (C) Element is Essential for Ensuring a Certain strength after quenching. To ensure a strength after quenching of 1.2 GPa or more, the C content should be 0.10 percent by mass or more. In contrast, carbon, if contained in a content exceeding 0.70 percent by mass, may impair the toughness of martensite, and the upper limit of the C content is 0.70 percent by mass. The lower limit of the C content is preferably 0.15 percent by mass and more preferably 0.25 percent by mass. The upper limit of the C content is preferably 0.60 percent by mass and more preferably 0.45 percent by mass.

(Mn: 0.1 to 3.0 Percent by Mass)

Manganese (Mn) Element is Necessary to Ensure Satisfactory hardenability and to improve the strength of martensite. Manganese, if contained in a content of less than 0.1 percent by mass, may not give the above-mentioned effects. In contrast, manganese, if contained in a content of exceeding 3.0 percent by mass, may cause deterioration of toughness and hot workability. The Mn content is preferably 2.5 percent by mass or less and more preferably 2.0 percent by mass or less. The Mn content is preferably 0.2 percent by mass or more and more preferably 0.5 percent by mass or more.

(Al: 0.005 to 2.0 Percent by Mass)

Aluminum (Al) element is used as a deoxidizer. Aluminum, if contained in a content of less than 0.005 percent by mass, may not exhibit this effect satisfactorily, and aluminum, if contained in a content of more than 2.0 percent by mass, may cause larger amounts of inclusions and thereby impair fatigue characteristics and toughness. The Al content should therefore be 2.0 percent by mass or less. The Al content is preferably 0.10 percent by mass or less and more preferably 0.050 percent by mass or less. The Al content is preferably 0.010 percent by mass or more and more preferably 0.015 percent by mass or more.

(P: 0.050 Percent by Mass or Less)

Phosphorus (P) Element May Lower the Toughness and is desirably minimized. However, phosphorus is often contained in the steel as impurities in a content of 0.001 percent by mass or more, the reduction of the P content to be lower than this level requires a special refining process, and this increases the material cost. Accordingly, the P content herein is set to be 0.050 percent by mass or less, because phosphorus within this range does not significantly impair the toughness. The lower limit of the P content is 0.001 percent by mass from the viewpoint of avoiding increase in material cost. The P content is preferably 0.020 percent by mass or less and more preferably 0.015 percent by mass or less.

(S: 0.50 Percent by Mass or Less)

Sulfur (S) May Lower the Toughness. Sulfur, However, is often contained in the steel as impurities in a content of 0.001 percent by mass or more, and the reduction of the S content to be lower than this level requires a special refining process, and this increases the material cost. On the other hand, sulfur, when contained, forms MnS and thereby effectively improves machinability. Therefore, when the steel needs machinability at certain level according to required properties, sulfur is preferably contained in the steel. However, sulfur, if contained in a content of more than 0.50 percent by mass, may significantly lower the toughness, and the S content should therefore be 0.50 percent by mass or less. When the machinability is not required, the lower limit of the S content is 0.001 percent by mass from the viewpoint of avoiding the increase in material cost as mentioned above. When the machinability is required, the S content is preferably 0.01 percent by mass or more.

The S content is preferably 0.20 percent by mass or less and more preferably 0.10 percent by mass or less.

(O: 0.0030 Percent by Mass or Less)

Oxygen (O) element may lower the toughness and is thereby desirably minimized. However, oxygen is often contained in the steel as impurities in a content of 0.0001 percent by mass or more, the reduction of the O content to be lower than this level requires a special refining process, and this increases the material cost. Accordingly, the O content is set to be 0.0030 percent by mass or less, because oxygen within this range does not significantly impair the toughness. The lower limit of the O content is 0.0001 percent by mass from the viewpoint of avoiding the increase in material cost as mentioned above. The O content is preferably 0.0020 percent by mass or less and more preferably 0.0015 percent by mass or less.

(N: 0.0200 Percent by Mass or Less)

Nitrogen (N) is Generally Contained in the Steel as impurities in a content of 0.0005 percent by mass or more. When the steel contains Ti, Zr, Ta and/or Hf, nitrogen combines with these elements to form nitrides as coarse inclusions to thereby lower the fatigue characteristics. The steel therefore contains nitrogen as less as possible. The N content should therefore be 0.0200 percent by mass or less. The N content is preferably less than 0.0100 percent by mass, more preferably 0.0070 percent by mass or less and furthermore preferably 0.0035 percent by mass or less.

(Ti: 0.30 Percent by Mass or Less, Nb: 0.30 Percent by Mass or Less)

Titanium (Ti) and niobium (Nb) elements are most important in the present invention, and the steel should contain at least one of them. Titanium and niobium combine with carbon and/or nitrogen to form fine precipitates typically of carbides, nitrides, and carbonitrides, which are stable even in austenite and thereby suppress the growth of austenite grains. However, these elements, if contained in excessively large contents, may remain undissolved in larger amounts even after heating and may impede the formation of fine precipitates effectively. In addition, coarse carbides of these elements cause fracture and thereby lower the toughness. The Ti and Nb contents should therefore be each 0.30 percent by mass or less. The Ti and Nb contents are each preferably 0.10 percent by mass or less and more preferably 0.08 percent by mass or less. The Ti and Nb contents are each preferably 0.02 percent by mass or more and more preferably 0.04 percent by mass or more.

(Residue being Fe and Inevitable Impurities)

The residues are Fe and inevitable impurities. Exemplary inevitable impurities include Sn and Sb.

($TH=(\{Ti\}/48+\{Nb\}/93)\times10^4$: 1.0 or more)

The TH value as determined according to following Formula 1 represents the sum of moles of Ti and Nb in precipitates having sizes of 5 to 100 nm and is a most important parameter in the present invention.

$$TH=(\{Ti\}/48+\{Nb\}/93)\times10^4 \qquad \text{(Formula 1)}$$

Precipitates (carbonitrides) containing Ti and/or Nb are stable in austenite and suppress the growth of γ grains. The degree of suppression is believed to be generally proportional to the volume fraction divided by the grain size of precipitates; and the volume fraction is proportional to the sum of moles of Ti and Nb. Accordingly, Formula 1 holds.

In Formula 1, the symbols {Ti} and {Nb} represent contents (percent by mass) of Ti and Nb, respectively, in precipitates having sizes of 5 to 100 nm. The contents of Ti and Nb contained in precipitates having such sizes much significantly affect the toughness and resistance to delayed fracture. Precipitates containing Ti and Nb, if having sizes of less than 5 nm, are very fine, part of which may be dissolved again during γ transformation, and may cause abnormal grain growth to give abnormally coarse grains. Precipitates containing Ti and Nb, if having sizes of more than 100 nm, may be excessively coarse to cause grains to form in a less number, and may also cause fracture, thus impairing the toughness and resistance to delayed fracture.

The {Ti} and {Nb} represent amounts as measured on a residue of the steel after extraction, respectively, and do not represent the amounts of Ti and Nb added to the alloy (steel). The Ti and Nb contents in a residue of the steel after extraction can be measured, for example, by electrolytically extracting the steel to give a residue and chemically analyzing the residue.

The electrolytic extraction is performed, for example, at a current of 200 A/m² or less using, as an electrolyte, a methanol solution containing 10% acetylacetone and 1% tetramethylammonium chloride. The Ti and Nb contents in the residue after extraction can be measured by using polycarbonate filters having pore sizes of 0.1 μm and 2.0 μm, respectively. Specifically, the contents of Ti and Nb in precipitates having sizes of 5 to 100 nm ({Ti} and {Nb}) can be determined respectively by subtracting an amount determined using the 2.0-μm filter from an amount determined using the 0.1-μm filter.

Substitution of thus-determined {Ti} and {Nb} into Formula 1 gives a TH value. If the determined TH value is less than 1.0, austenite grains have not sufficiently effectively small sizes, and this impedes the steel to have a higher strength and a higher toughness after the steel is subjected to a heat treatment performed in a subsequent process under customary conditions. The TH value is preferably 2.0 or more and more preferably 3.0 or more.

(Grain Size: 10 μm or Less)

The grain size of the steel before a heat treatment significantly affects the prior γ (prior austenite) grain size after the heat treatment. The prior γ grain size after the heat treatment can be decreased with a decreasing grain size of the steel before the heat treatment. For this reason, the steel should have a grain size before heat treatment of 10 μm or less. The steel, if having a grain size of more than 10 μm before a heat treatment, may not have a prior γ grain size after the heat treatment of 5 μm or less satisfactorily. The steel has a grain size of preferably 3 μm or less and more preferably 2 μm or less.

The grain size (crystal grain size) herein is measured in the following manner.

Specifically, a slab of a sample steel for heat treatment is prepared, a crystal orientation analysis using an electron backscatter diffraction pattern (EBSP) is performed on a cross-section of the slab in parallel with the hot rolling direction at a gauge center part (at a position of half depth the gauge (thickness) in the gauge direction). Then, boundaries with tilt angles of 15 degrees or more are defined as grain boundaries, and grain sizes are determined. The measurement is performed in a 200-μm square area at measurement steps (intervals) of 0.1 μm. Data of measurement points having a confidence index, indicating the reliability of measurement orientation, of 0.1 or less are excluded from objects to be analyzed. Grains having grain sizes of 0.4 μm or less are determined as measurement noise and are excluded from the calculation of average grain size. The grain size can be measured in the above manner.

The relationship between the TH value and the grain size will be described below. FIG. 1 is a graph showing how the prior γ grain size (μm) varies depending on the TH value as determined according to Formula 1 on a steel for heat treatment (◇) having a grain size of 10 μm or less, and on a steel for heat treatment (■) having a grain size of more than 10 μm. The heat treatments were performed under quenching conditions (at a heating temperature for 850° C. for a holding time of 60 seconds) and under tempering conditions (at a heating temperature of 450° C. for a holding time of 1800 seconds).

FIG. 1 demonstrates that the steel for heat treatment (■) having a grain size of more than 10 μm gives, after the heat treatment, a steel having a prior γ grain size of more than 5 μm even when the steel has a TH value of 1.0 or more. FIG. 1 also demonstrates that even the steel for heat treatment (◇) having a grain size of 10 μm or less, if having a TH value of less than 1.0, gives, after the heat treatment, a steel having a prior γ grain size of more than 5 μm. Accordingly, FIG. 1 demonstrates that the resulting steels in any case having a prior γ grain size after the heat treatment of more than 5 μm fail to have a high strength and a high toughness.

FIG. 1 indicates that, to allow a steel sheet after the heat treatment to have a high strength and a high toughness, namely, to allow the steel sheet after the heat treatment to have a prior γ grain size of 5 μm or less, the steel to be subjected to the heat treatment should have a TH value of 1.0 or more and should gives through hot rolling a steel having a grain size of 10 μm or less.

(Ni, Cu and/or Cr: 3.0 Percent by Mass or Less)

The steel for heat treatment according to the present invention preferably contains at least one element selected from the group consisting of Ni: 3.0 percent by mass or less and Cu: 3.0 percent by mass or less.

Nickel (Ni), copper (Cu) and chromium (Cr) elements effectively improve the strength and toughness, improve the corrosion resistance, and can be added according to required properties. However, Ni, Cu and Cr, if contained in contents each exceeding a certain level, may exhibit significantly insufficient effects and the Ni, Cu and Cr contents should therefore each be 3.0 percent by mass or less. The Ni, Cu and Cr contents are each preferably 1.5 percent by mass or less and more preferably 1.2 percent by mass or less. The Ni, Cu and Cr contents are each preferably 0.20 percent by mass or more and more preferably 0.50 percent by mass or more.

(Ca and Mg: 0.0050 Percent by Mass or Less; One or More Rare Earth Metals (REM): 0.020 Percent by Mass or Less)

The steel for heat treatment according to the present invention preferably contains at least one element selected from the group consisting of Ca: 0.0050 percent by mass or less, Mg: 0.0050 percent by mass or less and one or more rare earth metals (REM): 0.020 percent by mass or less.

Calcium (Ca), magnesium (Mg) and rare earth metals (REM) (rare-earth elements) each form sulfides, thereby prevent elongation or growth of MnS inclusions and improve the toughness. These elements can be added according to required properties. Ca, Mg and rare earth metals (REM), if added in contents at certain levels or more, respectively, may contrarily impair the toughness. For this reason, the Ca content should be 0.0050 percent by mass or less, the Mg content should be 0.0050 percent by mass or less, and the rare earth metal (REM) content should be 0.020 percent by mass or less. The Ca content is preferably 0.0030 percent by mass or less, the Mg content is preferably 0.0030 percent by mass or less, and the rare earth metal (REM) content is preferably 0.010 percent by mass or less. The Ca and Mg contents are each preferably 0.0005 percent by mass or more, and the rare earth metal (REM) content is preferably 0.0010 percent by mass or more.

Exemplary rare earth metals (REM) include Ce and La, and such rare earth metals can be added as an alloy containing two or more rare-earth elements, i.e., as a misch metal.

(V: 1.0 Percent by Mass or Less; Zr, Hf, Ta: 0.10 Percent by Mass or Less)

Independently, the steel for heat treatment according to the present invention preferably contains at least one element selected from the group consisting of V: 1.0 percent by mass or less, Zr: 0.10 percent by mass or less, Ta: 0.10 percent by mass or less and Hf: 0.10 percent by mass or less.

Vanadium (V) element combines with C and/or N to form carbides and/or carbonitrides and thereby strengthens precipitates. In addition, vanadium (V) precipitates also in austenite to reduce the γ grain size. However, vanadium, if contained in a content of more than 1.0 percent by mass, may remain undissolved in a larger amount upon heating. This lowers the above effects and, in addition, such coarse carbides cause fracture to thereby lower the toughness. For this reason, the V content should be 1.0 percent by mass or less. The V content is preferably 0.60 percent by mass or less, more preferably 0.50 percent by mass or less and furthermore preferably 0.3 percent by mass or less. The V content is preferably 0.05 percent by mass or more and more preferably 0.10 percent by mass or more.

Independently, Zr, Hf and Ta combine with nitrogen (N) to form nitrides which are stable and suppress the growth of γ grains in size during heating. These elements are therefore effective for allowing the ultimate metal microstructure to be finer and for improving the toughness. However, Zr, Hf and Ta, if contained each in a content of more than 0.10 percent by mass, may form coarse nitrides to impair fatigue characteristics, thus being undesirable. For these reasons, the Zr, Hf and Ta contents should each be 0.10 percent by mass or less. The Zr, Hf and Ta contents are preferably 0.050 percent by mass or less and more preferably 0.025 percent by mass or less. The Zr, Hf and Ta contents are each preferably 0.005 percent by mass or more.

(Si: 3.0 Percent by Mass or Less)

The steel for heat treatment according to the present invention preferably contains Si: 3.0 percent by mass or less.

Silicon (Si) acts as a deoxidizer and allows cementite precipitated during tempering to be finer, thus improving the toughness. Silicon needs not to be added when one or more other deoxidizers such as Al and Mn are added. The steel, if having a Si content of more than 3.0 percent by mass, may suffer from deterioration in toughness and/or hot workability, and therefore the upper limit of the Si content should be 3.0 percent by mass. The Si content is preferably 2.5 percent by mass or less and more preferably 2.0 percent by mass or less. Silicon, if contained in a content of less than 0.1 percent by mass, may not sufficiently exhibit the deoxidizing effect, and the Si content is preferably 0.10 percent by mass or more and more preferably 0.5 percent by mass or more.

(Mo: 2.0 Percent by Mass or Less, B: 0.0150 Percent by Mass or Less)

The steel for heat treatment according to the present invention preferably contains at least one element selected from the group consisting of Mo: 2.0 percent by mass or less and B: 0.0150 percent by mass or less.

Molybdenum (Mo) element allows the steel to ensure hardenability and to have improved strength of martensite. However, the steel, if having an excessively high Mo content, may suffer from deterioration in toughness and/or hot workability. The Mo content should therefore be 2.0 percent by mass or less. The Mo content is preferably 1.0 percent by mass or less and more preferably 0.5 percent by mass or less. The Mo content is preferably 0.1 percent by mass or more and more preferably 0.2 percent by mass or more.

Boron (B) element is, when added in a trace amount, very effective for significantly improving the hardenability to give a martensite microstructure. However, the steel, if having a B content of more than 0.0150 percent by mass, may suffer from deteriorated hot workability. The B content should therefore be 0.0150 percent by mass or less. The B content is preferably 0.0050 percent by mass or less and more preferably 0.0035 percent by mass or less. The B content is preferably 0.0005 percent by mass or more.

(Hardness: Vickers Hardness (Hv) of 450 or Less)

The steel for heat treatment according to the present invention preferably has a hardness in term of Vickers hardness (Hv) of 450 or less.

As used herein the term "hardness" refers to the magnitude of resistance to external force. The steel, if having an excessively high hardness in term of Vickers hardness (Hv) of more than 450, may cause a mold to have a shorter life, which mold is used in a working such as wire drawing, cold rolling or cold forging performed prior to the heat treatment such as quenching and/or tempering. For this reason, the hardness in terms of Vickers hardness (Hv) should be 450 or less. The hardness in terms of Vickers hardness (Hv) is preferably 400 or less and more preferably 350 or less.

The hardness herein is measured in accordance with the Vickers Hardness Test—Test Method prescribed in Japanese Industrial Standards (JIS) Z 2244. The hardness is preferably determined as an average by measuring hardness at three points and averaging the three measurements.

In other words, the steel for heat treatment according to the present invention can have a finer microstructure before quenching and thereby can contain a larger amount of reverse transformation nuclei of austenite (γ) as formed. In addition, the steel contains such fine and stable precipitates prior to quenching, and such precipitates impede the growth of γ grains after transformation thereto. Thus, the steel for heat treatment will have a high strength and a high toughness after a heat treatment performed in a subsequent process even under customary conditions.

The reduction in size of the microstructure before quenching is achieved by reducing the size of γ grains upon hot rolling and allowing transformation from deformed γ to occur. Alternatively, the reduction in size of the microstructure before quenching is performed by allowing fine and stable precipitates such as carbonitrides of Ti and Nb to precipitate during solidification or during heating for soaking, and performing hot rolling at a lower heating temperature to reduce heat generation due to hot rolling. This allows γ grains to be finer at early stages of heating in hot rolling, suppresses the recrystallization of γ grains during hot rolling, and gives deformed γ (worked γ) having accumulated strain. Thus, the above-mentioned effects are obtained.

Figure 2:
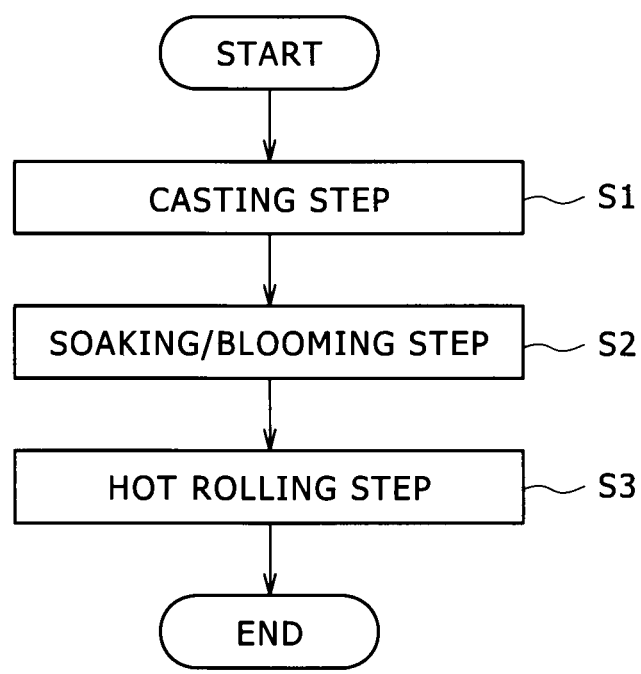
FIG. 2 is a flow chart showing an exemplary method for producing a steel for heat treatment according to the present invention.

The steel for heat treatment according to the present invention as illustrated above is advantageously produced, for example, by a production method including a casting step S1, a soaking/blooming step S2 and a hot rolling step S3, as illustrated in FIG. 2. FIG. 2 is a flow chart showing an exemplary method for producing the steel for heat treatment according to the present invention.

The casting step S1 is the step of casting an ingot (steel ingot), which ingot contains C: 0.10 to 0.70 percent by mass, Mn: 0.1 to 3.0 percent by mass, Al: 0.005 to 2.0 percent by mass, P: 0.050 percent by mass or less, S: 0.50 percent by mass or less, O: 0.0030 percent by mass or less and N: 0.0200 percent by mass or less and further contains at least one element selected from the group consisting of Nb: 0.30 percent by mass or less and Ti: 0.30 percent by mass or less, with the residue being Fe and inevitable impurities.

In the casting step S1, according to required properties, the ingot may further contain at least one element selected from the group consisting of Ni: 3.0 percent by mass or less, Cu: 3.0 percent by mass or less and Cr: 3.0 percent by mass or less. The ingot may also further contain at least one element selected from the group consisting of Ca: 0.0050 percent by mass or less, Mg: 0.0050 percent by mass or less and one or more rare earth metals (REM): 0.020 percent by mass or less. Likewise, the ingot may further contain at least one element selected from the group consisting of V: 1.0 percent by mass or less, Zr: 0.10 percent by mass or less, Ta: 0.10 percent by mass or less and Hf: 0.10 percent by mass or less. The ingot may contain Si: 3.0 percent by mass or less and/or may contain at least one element selected from the group consisting of Mo: 2.0 percent by mass or less and B: 0.0150 percent by mass or less.

These alloy components, alloy compositions, and others have been described in detail above, and description thereof will be omitted.

Next, the soaking/blooming step S2 is the step of soaking the cast ingot at 1250° C. to 1350° C. for 1 hour or longer and dividing the soaked ingot into slabs having a predetermined size.

The soaking of the ingot under the specific conditions accelerates the dissolution (solid-solution) of Nb and Ti during blooming, and thereby allows fine carbides, nitrides, and carbonitrides to precipitate in a subsequent cooling process.

The soaking, if performed at a temperature of lower than 1250° C., may not allow Nb and Ti to be dissolved sufficiently. In contrast, the soaking, if performed at a temperature of higher than 1350° C., may cause a large amount of scale to thereby cause flaws.

The soaking/blooming step S2 is preferably performed at 1300° C. or higher for 2 hours or longer.

The hot rolling step S3 is the step of reheating the soaked slab at 850° C. to 1000° C. for 1 hour or shorter, hot-rolling the reheated slab, cooling the hot-rolled work to 700° C. at a cooling rate of 3° C./second or more, and holding the work at 700° C. to 450° C. for 90 seconds or longer. This step gives a steel for heat treatment according to the present invention.

The hot rolling at a relatively low temperature as above allows precipitates, which have been finely precipitated during heating in soaking, to remain fine without growing.

The reheating of the slab, if performed at a temperature of lower than 850° C., may cause the slab to have larger deformation resistance during hot rolling, and this may impair the hot rolling efficiency. In contrast, the reheating of the slab, if performed at a temperature of higher than 1000° C., may cause alloy components to dissolve during hot rolling to thereby cause reprecipitation of coarse carbides, nitrides, and carbonitrides, which have once precipitated as fine grains.

The hot rolling of the slab and the holding of the hot-rolled slab immediately thereafter are performed at a temperature of 900° C. or lower for a duration of 30 minutes or shorter.

The forced cooling to 700° C. at a cooling rate of 3° C./second or more gives a fine metal microstructure while preventing ferrite from becoming coarse. The cooling to 700° C., if performed at a cooling rate of less than 3° C./second, may not give the above-mentioned effects.

The cooling rate is preferably 6° C./second or more.

The holding at temperatures of 700° C. to 450° C. for 90 seconds or longer accelerates the formation of fine ferrite, bainite, or pearlite, or cementite and thereby prevents the formation of a hard microstructure. The holding at temperature of 700° C. to 450° C., if performed for a duration of shorter than 90 seconds, may not satisfactorily accelerate the formation of these fine microstructures. The transformation, if performed at 500° C. or lower, may give a hard microstructure such as martensite and is not desirable when the steel is to be subjected typically to cold working.

The holding at temperatures of 700° C. to 450° C. is preferably performed for a duration of 180 seconds or longer.

The above-mentioned method for producing a steel for heat treatment employs a specific alloy composition and specific production conditions, thereby suppresses the growth of γ grains after transformation, and produces a steel for heat treatment which will have a high strength of 1.2 GPa or more and a high toughness in terms of ductile-brittle transition temperature (vTrs) of −80° C. or lower, after a heat treatment performed in a subsequent process even under customary conditions.

EXAMPLES

Next, advantageous effects of the present invention will be described with reference to several working examples satisfying the conditions specified in the present invention, in comparison to comparative examples not satisfying the conditions specified in the present invention.

Initially, steels having alloy compositions shown in Table 1 were molten in a small-sized ingot-making furnace, cast, subjected to soaking/blooming and hot rolling under conditions shown in Table 2, and thereby yielded a series of slabs having a gauge (thickness) of 16 mm according to Examples 1 to 22 and Comparative Examples 1 to 6. These slabs were subjected to quenching and tempering (heat treatment) under conditions shown in Table 2.

TABLE 1

| Category | | C | Si | Mn | P | S | Cu | Ni | Cr | Mo | V | Nb | Ti |
|---|---|---|---|---|---|---|---|---|---|---|---|---|---|
| Comp. Ex. | 1 | 0.40 | 1.71 | 0.60 | 0.009 | 0.005 | — | — | 1.01 | — | — | 0.050 | 0.049 |
| Comp. Ex. | 2 | 0.40 | 1.71 | 0.60 | 0.009 | 0.005 | — | — | 1.01 | — | — | 0.050 | 0.049 |
| Example | 1 | 0.40 | 1.71 | 0.60 | 0.009 | 0.005 | — | — | 1.01 | — | — | 0.050 | 0.049 |
| Example | 2 | 0.40 | 1.71 | 0.60 | 0.009 | 0.005 | — | — | 1.01 | — | — | 0.050 | 0.049 |
| Comp. Ex. | 3 | 0.40 | 1.71 | 0.60 | 0.009 | 0.005 | — | — | 1.01 | — | — | 0.050 | 0.049 |
| Example | 3 | 0.40 | 1.71 | 0.60 | 0.009 | 0.005 | — | — | 1.01 | — | — | 0.050 | 0.049 |
| Comp. Ex. | 4 | 0.40 | 1.71 | 0.60 | 0.009 | 0.005 | — | — | 1.01 | — | — | 0.050 | 0.049 |
| Comp. Ex. | 5 | 0.40 | 1.71 | 0.60 | 0.009 | 0.005 | — | — | 1.01 | — | — | 0.050 | 0.049 |
| Example | 4 | 0.40 | 1.71 | 0.60 | 0.009 | 0.005 | — | — | 1.01 | — | — | 0.050 | 0.049 |
| Comp. Ex. | 6 | 0.40 | 1.71 | 0.60 | 0.009 | 0.005 | — | — | 1.01 | — | — | 0.050 | 0.049 |
| Example | 5 | 0.40 | 1.71 | 0.60 | 0.009 | 0.005 | — | — | 1.01 | — | — | 0.050 | 0.049 |
| Example | 6 | 0.41 | 1.99 | 0.58 | 0.009 | 0.005 | 0.50 | 0.49 | 0.99 | 0.29 | — | 0.051 | 0.050 |
| Example | 7 | 0.39 | 1.85 | 0.60 | 0.009 | 0.005 | — | — | 1.00 | — | — | — | 0.100 |
| Example | 8 | 0.40 | 1.86 | 0.60 | 0.009 | 0.005 | — | — | 0.99 | — | — | 0.190 | — |
| Example | 9 | 0.40 | 1.95 | 1.00 | 0.009 | 0.005 | — | — | 1.00 | — | 0.16 | 0.050 | 0.051 |
| Example | 10 | 0.38 | 0.85 | 1.00 | 0.009 | 0.005 | — | — | 1.00 | — | — | 0.050 | 0.049 |
| Example | 11 | 0.40 | 0.99 | 1.00 | 0.009 | 0.005 | 1.00 | 1.00 | — | 0.50 | — | 0.043 | 0.051 |
| Example | 12 | 0.41 | 0.19 | 1.99 | 0.009 | 0.005 | — | — | 1.50 | 0.30 | — | 0.045 | 0.048 |
| Example | 13 | 0.40 | 1.86 | 0.50 | 0.009 | 0.005 | 0.50 | 0.50 | 0.50 | 0.30 | — | 0.050 | 0.050 |
| Example | 14 | 0.41 | 1.88 | 1.00 | 0.009 | 0.005 | — | — | 0.44 | — | — | 0.031 | 0.047 |
| Example | 15 | 0.40 | 1.96 | 0.98 | 0.009 | 0.005 | — | — | 0.45 | — | — | 0.044 | 0.050 |
| Example | 16 | 0.41 | 1.94 | 1.00 | 0.009 | 0.005 | — | — | 0.46 | — | — | 0.050 | 0.049 |
| Example | 17 | 0.40 | 0.98 | 0.99 | 0.009 | 0.005 | — | — | 0.45 | — | — | 0.047 | — |
| Example | 18 | 0.39 | 0.99 | 1.00 | 0.009 | 0.005 | — | — | 0.46 | — | — | 0.048 | — |
| Example | 19 | 0.40 | 1.85 | 1.00 | 0.009 | 0.005 | — | — | 0.45 | — | 0.40 | 0.049 | — |

TABLE 1-continued

| Category | | | | | | | | | | | | | |
|---|---|---|---|---|---|---|---|---|---|---|---|---|---|
| Example | 20 | 0.15 | 0.31 | 1.00 | 0.009 | 0.005 | 0.50 | 0.50 | 0.99 | 0.30 | — | 0.051 | 0.044 |
| Example | 21 | 0.59 | 1.95 | 0.50 | 0.009 | 0.005 | — | — | 0.95 | — | — | 0.050 | 0.050 |
| Example | 22 | 0.40 | — | 0.61 | 0.009 | 0.005 | — | — | 1.01 | — | — | 0.049 | 0.048 |

| Category | | Alloy composition (percent by mass) | | | | | | | |
|---|---|---|---|---|---|---|---|---|---|
| | | Al | B | Ca | Mg | REM | Zr, Hf, Ta | N | O |
| Comp. Ex. | 1 | 0.031 | 0.0023 | — | — | — | — | 0.0032 | 0.0012 |
| Comp. Ex. | 2 | 0.031 | 0.0023 | — | — | — | — | 0.0032 | 0.0012 |
| Example | 1 | 0.031 | 0.0023 | — | — | — | — | 0.0032 | 0.0012 |
| Example | 2 | 0.031 | 0.0023 | — | — | — | — | 0.0032 | 0.0012 |
| Comp. Ex. | 3 | 0.031 | 0.0023 | — | — | — | — | 0.0032 | 0.0012 |
| Example | 3 | 0.031 | 0.0023 | — | — | — | — | 0.0032 | 0.0012 |
| Comp. Ex. | 4 | 0.031 | 0.0023 | — | — | — | — | 0.0032 | 0.0012 |
| Comp. Ex. | 5 | 0.031 | 0.0023 | — | — | — | — | 0.0032 | 0.0012 |
| Example | 4 | 0.031 | 0.0023 | — | — | — | — | 0.0032 | 0.0012 |
| Comp. Ex. | 6 | 0.031 | 0.0023 | — | — | — | — | 0.0032 | 0.0012 |
| Example | 5 | 0.031 | 0.0023 | — | — | — | — | 0.0032 | 0.0012 |
| Example | 6 | 0.029 | — | — | — | — | — | 0.0030 | 0.0012 |
| Example | 7 | 0.021 | 0.0021 | — | — | — | — | 0.0054 | 0.0010 |
| Example | 8 | 0.023 | 0.0026 | — | — | — | — | 0.0031 | 0.0011 |
| Example | 9 | 0.025 | 0.0020 | — | — | — | — | 0.0034 | 0.0012 |
| Example | 10 | 0.022 | 0.0020 | — | — | — | — | 0.0030 | 0.0012 |
| Example | 11 | 0.026 | 0.0031 | — | — | — | — | 0.0029 | 0.0012 |
| Example | 12 | 0.021 | 0.0032 | — | — | — | — | 0.0033 | 0.0012 |
| Example | 13 | 0.020 | — | — | — | — | — | 0.0021 | 0.0012 |
| Example | 14 | 0.022 | 0.0019 | — | — | — | Zr: 0.021 | 0.0030 | 0.0011 |
| Example | 15 | 0.025 | 0.0032 | — | — | — | Hf: 0.049 | 0.0035 | 0.0012 |
| Example | 16 | 0.028 | 0.0031 | — | — | — | Ta: 0.036 | 0.0030 | 0.0015 |
| Example | 17 | 0.026 | 0.0030 | 0.0019 | — | — | — | 0.0025 | 0.0013 |
| Example | 18 | 0.021 | 0.0033 | — | 0.0011 | — | — | 0.0031 | 0.0012 |
| Example | 19 | 0.026 | 0.0029 | — | — | 0.0031 | — | 0.0029 | 0.0012 |
| Example | 20 | 0.025 | 0.0026 | — | — | — | — | 0.0029 | 0.0012 |
| Example | 21 | 0.029 | 0.0020 | — | — | — | — | 0.0031 | 0.0012 |
| Example | 22 | 0.031 | 0.0021 | — | — | — | — | 0.0029 | 0.0012 |

TABLE 2

| Category | | Soaking/blooming conditions | | Hot rolling conditions | | Cooling conditions | | Properties after hot rolling | | |
|---|---|---|---|---|---|---|---|---|---|---|
| | | Heating temperature (° C.) | Heating time (hr) | Heating temperature (° C.) | Heating time (hr) | Cooling rate to 700° C. after hot rolling (° C./s) | Holding time at 700° C. to 450° C. (s) | TH value | Grain size (μm) | Hardness Hv |
| Comp. Ex. | 1 | 1175 | 1 | 1000 | 1 | 10 | 200 | 0.4 | 15.0 | 295 |
| Comp. Ex. | 2 | 1225 | 1 | 1000 | 1 | 10 | 200 | 0.7 | 9.0 | 300 |
| Example | 1 | 1275 | 1 | 1000 | 1 | 10 | 200 | 1.5 | 5.0 | 320 |
| Example | 2 | 1325 | 1 | 1000 | 1 | 10 | 200 | 3.7 | 3.5 | 325 |
| Comp. Ex. | 3 | 1275 | 1 | 1100 | 1 | 10 | 200 | 0.8 | 7.0 | 302 |
| Example | 3 | 1275 | 1 | 900 | 1 | 10 | 200 | 3.5 | 2.5 | 330 |
| Comp. Ex. | 4 | 1275 | 0.5 | 1000 | 1 | 10 | 200 | 0.8 | 8.5 | 300 |
| Comp. Ex. | 5 | 1275 | 1 | 1000 | 3 | 10 | 200 | 0.9 | 5.5 | 320 |
| Example | 4 | 1325 | 2 | 900 | 0.5 | 10 | 200 | 5.1 | 1.5 | 350 |
| Comp. Ex. | 6 | 1275 | 1 | 1000 | 1 | 1 | 250 | 1.6 | 12.0 | 295 |
| Example | 5 | 1275 | 1 | 1000 | 1 | 10 | 30 | 1.4 | 2.2 | 470 |
| Example | 6 | 1325 | 2 | 900 | 0.5 | 10 | 200 | 4.6 | 1.9 | 352 |
| Example | 7 | 1325 | 2 | 900 | 0.5 | 10 | 200 | 4.8 | 2.3 | 342 |
| Example | 8 | 1325 | 2 | 900 | 0.5 | 10 | 200 | 4.5 | 1.2 | 324 |
| Example | 9 | 1325 | 2 | 900 | 0.5 | 10 | 200 | 4.9 | 2.1 | 362 |
| Example | 10 | 1325 | 2 | 900 | 0.5 | 10 | 200 | 4.9 | 1.9 | 295 |
| Example | 11 | 1325 | 2 | 900 | 0.5 | 10 | 200 | 4.8 | 1.8 | 385 |
| Example | 12 | 1325 | 2 | 900 | 0.5 | 10 | 200 | 4.9 | 1.8 | 354 |
| Example | 13 | 1325 | 2 | 900 | 0.5 | 10 | 200 | 4.7 | 1.6 | 346 |
| Example | 14 | 1325 | 2 | 900 | 0.5 | 10 | 200 | 4.5 | 2.2 | 315 |
| Example | 15 | 1325 | 2 | 900 | 0.5 | 10 | 200 | 4.9 | 2.3 | 308 |
| Example | 16 | 1325 | 2 | 900 | 0.5 | 10 | 200 | 4.4 | 2.2 | 315 |
| Example | 17 | 1325 | 2 | 900 | 0.5 | 10 | 200 | 4.2 | 2.5 | 299 |
| Example | 18 | 1325 | 2 | 900 | 0.5 | 10 | 200 | 4.4 | 2.4 | 302 |
| Example | 19 | 1325 | 2 | 900 | 0.5 | 10 | 200 | 4.9 | 2.6 | 305 |
| Example | 20 | 1325 | 2 | 900 | 0.5 | 10 | 200 | 4.8 | 3.5 | 223 |
| Example | 21 | 1325 | 2 | 900 | 0.5 | 10 | 200 | 4.6 | 1.1 | 389 |
| Example | 22 | 1325 | 2 | 900 | 0.5 | 10 | 200 | 4.8 | 1.3 | 336 |

TABLE 2-continued

| Category | | Quenching conditions | | Tempering conditions | | Prior γ grain size (μm) | Properties after heat treatment | | Assessment |
|---|---|---|---|---|---|---|---|---|---|
| | | Heating temperature (° C.) | Holding time (s) | Heating temperature (° C.) | Holding time (s) | | Tensile strength (GPa) | Toughness vTrs (° C.) | |
| Comp. Ex. | 1 | 850 | 60 | 450 | 1800 | 10.5 | 1.53 | −30 | X |
| Comp. Ex. | 2 | 850 | 60 | 450 | 1800 | 6.5 | 1.54 | −50 | X |
| Example | 1 | 850 | 60 | 450 | 1800 | 4.5 | 1.55 | −92 | ○ |
| Example | 2 | 850 | 60 | 450 | 1800 | 2.1 | 1.56 | −140 | ○ |
| Comp. Ex. | 3 | 850 | 60 | 450 | 1800 | 5.9 | 1.54 | −66 | X |
| Example | 3 | 850 | 60 | 450 | 1800 | 2.5 | 1.55 | −132 | ○ |
| Comp. Ex. | 4 | 850 | 60 | 450 | 1800 | 6.0 | 1.54 | −75 | X |
| Comp. Ex. | 5 | 850 | 60 | 450 | 1800 | 5.5 | 1.54 | −61 | X |
| Example | 4 | 850 | 60 | 450 | 1800 | 1.8 | 1.56 | −150 | ⊚ |
| Comp. Ex. | 6 | 850 | 60 | 450 | 1800 | 7.2 | 1.54 | −42 | X |
| Example | 5 | 850 | 60 | 450 | 1800 | 4.2 | 1.55 | −95 | Δ |
| Example | 6 | 850 | 60 | 450 | 1800 | 2.0 | 1.65 | −160 | ○ |
| Example | 7 | 850 | 60 | 450 | 1800 | 2.3 | 1.51 | −102 | ○ |
| Example | 8 | 850 | 60 | 450 | 1800 | 1.5 | 1.55 | −172 | ○ |
| Example | 9 | 850 | 60 | 450 | 1800 | 2.1 | 1.61 | −132 | ○ |
| Example | 10 | 850 | 60 | 450 | 1800 | 2.3 | 1.55 | −139 | ○ |
| Example | 11 | 850 | 60 | 450 | 1800 | 1.8 | 1.74 | −156 | ○ |
| Example | 12 | 850 | 60 | 450 | 1800 | 2.1 | 1.65 | −160 | ○ |
| Example | 13 | 850 | 60 | 450 | 1800 | 2.5 | 1.63 | −158 | ○ |
| Example | 14 | 850 | 60 | 450 | 1800 | 2.6 | 1.51 | −105 | ○ |
| Example | 15 | 850 | 60 | 450 | 1800 | 2.7 | 1.51 | −110 | ○ |
| Example | 16 | 850 | 60 | 450 | 1800 | 2.6 | 1.51 | −116 | ○ |
| Example | 17 | 850 | 60 | 450 | 1800 | 2.7 | 1.51 | −110 | ○ |
| Example | 18 | 850 | 60 | 450 | 1800 | 2.5 | 1.48 | −108 | ○ |
| Example | 19 | 850 | 60 | 450 | 1800 | 2.2 | 1.46 | −100 | ○ |
| Example | 20 | 900 | 60 | 450 | 1800 | 2.9 | 1.31 | −155 | ○ |
| Example | 21 | 850 | 60 | 450 | 1800 | 1.1 | 1.98 | −158 | ○ |
| Example | 22 | 850 | 60 | 450 | 1800 | 1.5 | 1.46 | −158 | ○ |

The slabs produced according to Examples 1 to 22 and Comparative Examples 1 to 6 under the conditions in Table 1 and Table 2 were evaluated on TH value (contents of Ti and Nb in precipitates having sizes of 5 to 100 nm), grain size (μm) and hardness in terms of Vickers hardness (Hv) each after hot rolling. The slabs after subjected to quenching and tempering (heat treatment) under customary or common conditions were evaluated on properties as steels, i.e., on tensile strength (GPa), toughness (ductile-brittle transition temperature (vTrs (° C.))) and prior γ grain size (γm). The results of these evaluations are shown in Table 2.

Of the slabs according to Examples 1 to 22 and Comparative Examples 1 to 6, the TH value, grain size, and hardness in terms of Vickers hardness (Hv) after the hot rolling, and the tensile strength, toughness, and prior γ grain size after the heat treatment were evaluated in the following manner.

(1) TH Value (Contents of Ti and Nb in Precipitates Having Sizes of 5 to 100 nm)

A sample was taken from each slab after hot rolling at a position half depth the gauge, the sample was electrolytically extracted to give a residue, and the residue was chemically analyzed. The electrolytic extraction was performed by electrolytically extracting the sample with a methanol solution containing 10% acetylacetone and 1% tetramethylammonium chloride as an electrolyte at a current of 200 A/m² or less, and filtering the extract through 0.1-μm and 2.0-μm filters made of a polycarbonate and supplied by Advantech Toyo Kaisha, Ltd. Specifically, the contents of Ti and Nb ({Ti} and {Nb}) in precipitates having sizes of 5 to 100 nm can be determined respectively by subtracting the amount determined using the 2.0-μm filter from the amount determined using the 0.1-μm filter. The TH value was calculated according to following Formula 1:

$$TH = (\{Ti\}/48 + \{Nb\}/93) \times 10^4 \quad \text{(Formula 1)}$$

A sample having a TH value of 1.0 or more was evaluated as acceptable.

(2) Grain Size after Hot Rolling

The grain size after hot rolling was evaluated by a crystal orientation analysis using an electron backscatter diffraction pattern (EBSP) performed on a cross-section of the slab in parallel with the hot rolling direction at the gauge center part (at a position of half depth the gauge (thickness) in the gauge direction). Then, boundaries with tilt angles of 15 degrees or more were defined as grain boundaries, and grain sizes were determined. The measurement was performed in a 200-μm square area at measurement steps (intervals) of 0.1 μm. Data of measurement points having a confidence index, indicating the reliability of measurement orientation, of 0.1 or less were excluded from objects to be analyzed. Grains having grain sizes of 0.4 μm or less were determined as measurement noise and were excluded from the calculation of average grain size. A sample having a grain size after hot rolling of 10 μm or less was evaluated as acceptable.

(3) Hardness after Hot Rolling

The hardness was evaluated by measuring a Vickers hardness of the slab at three points in a gauge center part and averaging three measurements according to the procedure as in (2). A sample having a hardness in terms of Vickers hardness (Hv) of 450 or less was evaluated as being more preferred from the viewpoint of easiness in working. The hardness was measured in accordance with Vickers Hardness Test—Test Method as prescribed in JIS Z 2244.

(4) Tensile Strength

The measurement of the tensile strength was performed in accordance with the tensile test prescribed in JIS Z 2241. A sample having a tensile strength of 1.2 GPa or more was evaluated as acceptable.

(5) Toughness

The toughness was evaluated by preparing a JIS No. 3 specimen having 2-mmV-shaped notches, subjecting the specimen to a Charpy impact test, and determining a ductile-brittle transition temperature (vTrs (° C.)). A sample having a toughness in terms of ductile-brittle transition temperature (vTrs (° C.)) of −80° C. or lower was evaluated as acceptable. The Charpy impact test was performed in accordance with the method of Charpy impact test on metallic materials as prescribed in JIS Z 2242.

(6) Prior γ Grain Size

A sample was taken from the slab after heat treatment at a position of half depth in the gauge direction, etched with the AGS Solution (supplied by Yamamoto Scientific Tool Laboratory) for 3 to 5 minutes, and the prior γ grain size was evaluated through the cutting method. A sample having a prior γ grain size of 5 μm or less was evaluated as acceptable. The prior γ grain size was measured in accordance with the method prescribed in Steels—Micrographic determination of the apparent grain size in JIS G 0551.

Table 2 demonstrates that Examples 1 to 22 satisfy the conditions specified in the present invention and excelled in TH value, grain size, and hardness Hv after hot rolling and in tensile strength, toughness and prior γ grain size after heat treatment (assessment: ⊚ or ○). Example 5 had a high hardness after hot rolling, thereby showed somewhat insufficient workability, but had a high strength and a high toughness after heat treatment, and was synthetically assessed as acceptable (assessment: Δ).

In contrast, Comparative Examples 1 to 6 do not satisfy one of the conditions specified in the present invention, particularly one of the soaking/blooming conditions, hot rolling conditions and cooling conditions, and thereby showed a TH value after hot rolling of less than 1.0. Comparative Examples 1 to 6 therefore showed unsatisfactory results in any of grain size after hot rolling; and tensile strength, toughness and prior γ grain size after heat treatment (assessment: x).

Specifically, Comparative Examples 1, 2 and 4 underwent soaking/blooming at a low heating temperature and showed a low TH value after hot rolling. Comparative Example 3 underwent hot rolling at a high heating temperature and showed a low TH value after hot rolling. Comparative Example 5 underwent hot rolling for an excessively long heating time and showed a low TH value after hot rolling. Comparative Example 6 underwent cooling after hot rolling at an excessively low cooling rate and showed a large grain size after hot rolling.

The steel for heat treatment according to the present invention has been illustrated in detail with reference to the best mode for carrying out the invention and several working examples. It will be understood, however, that the scope of the invention is not limited thereto but may be variously embodied within the scope of the appended claims. This application is based on Japanese Patent Application No. 2008-160987 filed on Jun. 19, 2008, the entire contents of which are incorporated herein by reference.

REFERENCE SIGNS LIST

S1 casting step
S2 soaking/blooming step
S3 hot rolling step

The invention claimed is:

1. A steel for heat treatment, comprising:
C: 0.10 to 0.70 percent by mass,
Mn: 0.1 to 3.0 percent by mass,
Al: 0.005 to 2.0 percent by mass,
P: 0.050 percent by mass or less,
S: 0.50 percent by mass or less,
O: 0.0030 percent by mass or less,
N: 0.0200 percent by mass or less,
Ti: 0.30 percent by mass or less,
Nb: 0.050 to 0.30 percent by mass, and
Fe,
wherein:
the steel has a TH value as determined according to Formula 1 of 1.0 or more,
the steel has a grain size of 10 μm or less, and
the steel has a toughness in terms of ductile-brittle transition temperature of −80° C. or lower:

$$TH = (\{Ti\}/48 + \{Nb\}/93) \times 10^4 \quad \text{(Formula 1)}$$

where {Ti} and {Nb} represent contents of Ti and Nb, respectively, measured by percent by mass, in precipitates having sizes of from 5 to 100 nm.

2. The steel for heat treatment according to claim 1, further comprising:
an element selected from the group consisting of Ni: 3.0 percent by mass or less, Cu: 3.0 percent by mass or less, Cr: 3.0 percent by mass or less, and any mixture thereof.

3. The steel for heat treatment according to claim 1, wherein the steel has a hardness in term of Vickers hardness Hv of 450 or less.

4. The steel for heat treatment according to claim 2, wherein the steel has a hardness in term of Vickers hardness Hv of 450 or less.

5. The steel for heat treatment according to claim 1, further comprising:
an element selected from the group consisting of Ca: 0.0050 percent by mass or less, Mg: 0.0050 percent by mass or less, a rare earth metal: 0.020 percent by mass or less, and any mixture thereof.

6. The steel for heat treatment according to claim 1, further comprising:
an element selected from the group consisting of V: 1.0 percent by mass or less, Zr: 0.10 percent by mass or less, Ta: 0.10 percent by mass or less, Hf: 0.10 percet by mass or less, and any mixture thereof.

7. The steel for heat treatment according to claim 1, further comprising Si: 3.0 percent by mass or less.

8. The steel for heat treatment according to claim 1, further comprising:
an element selected from the group consisting of Mo: 2.0 percent by mass or less, B: 0.0150 percent by mass or less, and any mixture thereof.

9. The steel for heat treatment according to claim 1, wherein the steel comprises N of 0.0054 percent by mass or less.

10. The steel for heat treatment according to claim 1, wherein the steel comprises Ti of 0.02 percent by mass or more.

11. The steel for heat treatment according to claim 1, wherein the steel comprises Ti of 0.04 percent by mass or more.

12. The steel for heat treatment according to claim 1, wherein, after the heat treatment, the steel has a tensile strength of 1.2 GPa or more.

13. The steel for heat treatment according to claim 1, wherein, after the heat treatment, the steel has a ductile-brittle transition temperature of −80° C. or lower.

14. The steel for heat treatment according to claim 1, wherein the steel has a grain size of 3 μm or less.

15. The steel for heat treatment according to claim 1, wherein, after the heat treatment, the steel has a prior austenite grain size of 5 μm or less.

16. The steel for heat treatment according to claim 1, wherein the TH value is 2.0 or more.

17. The steel for heat treatment according to claim 1, wherein the TH value is 3.0 or more.

\* \* \* \* \*